(12) United States Patent
Hasegawa et al.

(10) Patent No.: US 7,884,996 B2
(45) Date of Patent: *Feb. 8, 2011

(54) DELAY-LINE DEMODULATOR

(75) Inventors: Junichi Hasegawa, Tokyo (JP);
Kazutaka Nara, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/629,846

(22) Filed: Dec. 2, 2009

(65) Prior Publication Data

US 2010/0073760 A1 Mar. 25, 2010

Related U.S. Application Data

(63) Continuation of application No. 12/248,871, filed on Oct. 9, 2008, now Pat. No. 7,649,678.

(30) Foreign Application Priority Data

Oct. 12, 2007 (JP) .............................. 2007-267153

(51) Int. Cl.
*G02F 2/00* (2006.01)
*G02B 6/12* (2006.01)

(52) U.S. Cl. .............................. 359/325; 385/1; 385/14; 398/205; 375/324

(58) Field of Classification Search .................. 359/237, 359/325; 385/1–9, 14, 129–132; 398/204, 398/205, 214; 375/324, 350
See application file for complete search history.

(56) References Cited

U.S. PATENT DOCUMENTS

| 6,961,492 | B2 | 11/2005 | Doerr |
| 7,259,901 | B2 | 8/2007 | Parsons et al. |
| 7,411,725 | B2 | 8/2008 | Suzuki et al. |
| 7,480,091 | B2 | 1/2009 | Hasegawa et al. |
| 7,606,504 | B2 * | 10/2009 | Onaka et al. ................. 398/214 |
| 7,649,678 | B2 * | 1/2010 | Hasegawa et al. ........... 359/325 |

FOREIGN PATENT DOCUMENTS

| JP | 200760442 A | 3/2007 |
| JP | 2007151026 A | 6/2007 |

* cited by examiner

*Primary Examiner*—Daniel Petkovsek
(74) *Attorney, Agent, or Firm*—Turocy & Watson, LLP

(57) ABSTRACT

A delay-line demodulator for demodulating a differential quadrature phase shift keying (DQPSK) signal is provided. The demodulator includes two Mach-Zehnder interferometers individually comprising two waveguides having different lengths therebetween and through which a light signal branched from the DQPSK signal propagates, respectively. A phase of the light signal propagating at one of the waveguides is delayed as compared to a phase of the light signal propagating at another one of the waveguides, wherein a divergence amount of polarization is adjusted by driving sets of heaters that are facing each other and sandwiching a half wavelength plate therebetween.

20 Claims, 8 Drawing Sheets

DELAY-LINE DEMODULATOR

CROSS-REFERENCE TO RELATED APPLICATIONS

This application is a continuation of application Ser. No. 12/248,871, now U.S. Pat. No. 7,649,678, filed on Oct. 9, 2008, issued on Jan. 19, 2010, entitled "DELAY-LINE DEMODULATOR" and issued as U.S. Pat. No. 7,649,678, which claims priority from Japanese patent application serial No. 2007-267153, filed on Oct. 12, 2007, the entireties of which are incorporated herein by reference.

BACKGROUND OF THE INVENTION

1. Technical Field

The present invention relates to a delay-line demodulator to be used for an optical fiber communication. In particular, it relates to a delay-line demodulator comprising a Mach-Zehnder interferometer (MZI) of a planar lightwave circuit (PLC) type for demodulating a signal of such as a differential quadrature phase shift keying (DQPSK), a differential phase shift keying (DPSK), or the like, regarding the optical fiber communication using a transmission method of a dense wavelength division multiplexing (DWDM).

2. Background Art

In recent years, an examination for a speed up of an optical transmission system (to be a line speed of 40 Gbps) is actively performed against a backdrop of a rapid spread of a broadband communication. However, there is provided a problem that a quality of a communication line cannot help but become poor because of a deterioration of a signal waveform due to a decrease of a duration per one bit of a light signal affecting a characteristic of an optical fiber in a case of speeding up the line speed. Moreover, it becomes hard to construct a network system with using a conventional fiber network because a repeater is required for such as converting a light signal into an electric signal during passing a transmission path and reconverting into a light signal therefrom, for performing a long distance transmission of the 40 Gbps level.

Therefore, there are investigated and developed currently, such as the differential quadrature phase shift keying (DQPSK) method, the differential phase shift keying (DPSK) method, or the like, that are a multivalued phase shift keying method to be able to reduce the deterioration of the signal waveform by being widened the duration of a light signal.

The DQPSK transmits four data with corresponding to four different light phase differences. That is to say, it is a phase shift keying method to change a phase of a propagation wave (, +/2, +, +3/2) for the four data as values (0, 1, 2, 3) of individual symbols comprised of data of two bits, with corresponding to a variation in values of neighboring two symbols. And then according to a 40 Gbps DQPSK communication method using such the DQPSK method, it becomes able to transmit a distance as four times longer than that for a 40 Gbps transmission using a conventional binary phase shift keying method. Moreover, it is considered that it becomes possible to construct the network system among large cities with using the conventional fiber network, according to such the DQPSK method.

While, regarding such the DPSK, a phase of a propagation wave (or +) is determined with corresponding to a variation in (or difference of) between a value of a bit (zero or one) transmitted previously and a value of a bit (zero or one) to be transmitted next.

So far, as a delay-line demodulator for demodulating such the DQPSK signal or the DPSK signal at a receiving device, there is known such as an optical receiving circuit as disclosed in a patent document 1, a demodulator as disclosed in a patent document 2, or the like.

Here, the optical receiving circuit as disclosed in the patent document 1 comprises an one symbol delay element at one side of one pair of optical paths, and a interferometer (the Mach-Zehnder interferometer) for propagating an input RZ-DPSK signal, that is to say, a DPSK signal to be performed a return to zero (RZ) phase shift keying therefor, via such the one pair of the optical paths. Moreover, by using such the interferometer (an one bit delay interferometer), the input RZ-DPSK signal becomes to be transformed into one pair of intensity modulated light signals as complementary therebetween.

Further, according to the patent document 2, there is disclosed a demodulator for demodulating using a Michelson interferometer regarding a light signal performed the differential phase shift keying (DPSK), or a light signal performed the differential quadrature phase shift keying (DQPSK).

[Patent Document 1] Japanese Patent Application Publication No. 2007-060442

[Patent Document 2] Japanese Patent Application Publication No. 2007-151026

DISCLOSURE OF THE INVENTION

Technical Problem

Here, it is said that an allowable value for a divergence amount of polarization (PDλ) is not larger than 0.5 GHz (0.004 nm) for the 40 Gbps DQPSK communication method using the DQPSK method having the line speed of 40 Gbps.

As a method for dissolving the divergence amount of polarization, it is also able to be considered a configuration that a half wavelength plate is inserted between two of waveguides in the Mach-Zehnder interferometer (MZI). However, it is still hard to suppress the divergence amount of polarization to be as not larger than 0.5 GHz, and then a yield cannot help but become to be worse, even in a case of designing to be such the configuration. Hence, it is quite hard to realize a delay-line demodulator having the small divergence amount of polarization (as the PDλ is less than 0.004 nm).

The present invention is presented with having regard to the above mentioned conventional problems, and an object is to provide a delay-line demodulator of which the divergence amount of polarization is reduced.

Technical Solution

For solving the above mentioned subjects, the present inventors have found out that it is able to adjust a divergence amount of polarization by driving each of heaters on Mach-Zehnder interferometers (MZIs) facing to a wavelength plate respectively, and then invented a method for reducing the polarization.

Next, a method for solving the above mentioned subjects will be described in detail below.

A delay-line demodulator according to the present invention as disclosed in claim 1 is a delay-line demodulator of a planar lightwave circuit type for a DQPSK signal to be demodulated, which is characterized in that comprises: two of Mach-Zehnder interferometers individually comprising two of waveguides having different lengths therebetween through which a light signal branched the DQPSK signal propagates respectively, for delaying a phase of the light signal propagating at one of the waveguides as an amount of one symbol comparing to a phase of the light signal propagating at another one of the waveguides; a half wavelength plate arranged at each central part of the two waveguides in each of the two Mach-Zehnder interferometers; a first heater (A) and a second heater (C) formed on the one of the waveguides in the individual Mach-Zehnder interferometers as sandwiching the half wavelength plate therebetween; and a third heater (B) and a fourth heater (D) formed on the other one of the waveguides in the individual Mach-Zehnder interferometers as sandwiching the half wavelength plate therebetween, wherein a divergence amount of polarization is adjusted by driving the first heater (A) and the fourth heater (D), or the third heater (B) and the second heater (C), that are facing to each other as sandwiching the half wavelength plate therebetween in the individual Mach-Zehnder interferometers.

A delay-line demodulator according to the present invention as disclosed in claim 2 is characterized in that a Y-branch waveguide for branching the DQPSK signal and the two Mach-Zehnder interferometers are formed on one PLC substrate as a planar lightwave circuit.

A delay-line demodulator according to the present invention as disclosed in claim 3 is characterized in that the individual Mach-Zehnder interferometers is a planar lightwave circuit to be formed individually on another independent PLC substrate, and the DQPSK signal is branched at an outside of the PLC substrate and then is input into the individual Mach-Zehnder interferometers.

A delay-line demodulator according to the present invention as disclosed in claim 4 is a delay-line demodulator of a planar lightwave circuit type for a DQPSK signal to be demodulated, which is characterized in that comprises: one Mach-Zehnder interferometer comprising two waveguides having different lengths therebetween, wherein a light signal branched the DQPSK signal propagates therethrough respectively, for delaying a phase of the light signal propagating at one of the waveguides as an amount of one bit comparing to a phase of the light signal propagating at another one of the waveguides; a half wavelength plate arranged at each central part of the two waveguides; a first heater (A) and a second heater (C) formed on the one of the waveguides as sandwiching the half wavelength plate therebetween; and a third heater (B) and a fourth heater (D) formed on the other one of the waveguides as sandwiching the half wavelength plate therebetween, wherein a divergence amount of polarization is adjusted by driving the first heater (A) and the fourth heater (D), or the third heater (B) and the second heater (C), that are facing to each other as sandwiching the half wavelength plate therebetween respectively.

EFFECTS OF THE INVENTION

According to the present invention as disclosed in claim 1, it becomes able to obtain a delay-line demodulator for a DQPSK signal of which the divergence amount of polarization is reduced.

According to the present invention as disclosed in claim 4, it becomes able to obtain a delay-line demodulator for a DPSK signal of which the divergence amount of polarization is reduced.

BEST MODE FOR CARRYING OUT INVENTION

A delay-line demodulator according to each of embodiments embodied the present invention will be described in detail below, based on the drawings. Here, a duplicated description will be omitted with using a similar symbol for the similar component part regarding the description for each of the embodiments.

The First Embodiment

A delay-line demodulator according to the first embodiment will be described in detail below, based on FIG. 1 to FIG. 6. FIG. 1 shows a schematic configuration regarding a delay-line demodulator according to the first embodiment. FIG. 2 shows a schematic configuration of an optical transmission system (optical transmitting and receiving device) with using a DQPSK method. FIG. 3 is a graph showing a variation in a divergence amount of polarization PDλ at a time of driving a heater A and a heater D among four of heaters A, B, C and D, with changing a voltage to be applied to such the heaters. FIG. 4 is a graph showing a variation in the divergence amount of polarization PDλ at a time of driving the heater C and the heater B with changing the voltage to be applied to such the heaters. FIG. 5 is a graph showing a variation in the divergence amount of polarization PDλ at a time of driving the heater A and the heater B with changing the voltage to be applied to such the heaters. And, FIG. 6 is a graph showing a variation in the divergence amount of polarization PDλ at a time of driving the heater C and the heater D with changing the voltage to be applied to such the heaters.

A delay-line demodulator 1 as shown in FIG. 1 is a delay-line demodulator (demodulator) of a planar lightwave circuit (PLC) type for demodulating a DQPSK signal. Such the delay-line demodulator 1 is a delay-line demodulator for a 40 Gbps DQPSK signal to be used for the optical transmission system as shown in FIG. 2 with using the DQPSK method having a line speed of 40 Gbps for example.

According to such the optical transmission system, the DQPSK signal is transmitted from an optical transmitter 40 to an optical fiber transmission path 54, which is modulated into phase data including a phase of a propagation wave (θ, θ+π/2, θ+π, θ+3π/2) for four data as values (0, 1, 2, 3) of individual symbols comprised of data of two bits, with corresponding to a variation in values of neighboring two symbols. Moreover, a DQPSK signal transmitted from the optical fiber transmission path 54 to an optical receiver 50 is converted into a light intensity signal in the delay-line demodulator 1, and then such the light intensity signal is converted into an electric signal in balanced receivers 51 and 52. Thus, it becomes able to demodulate the above mentioned four data regarding the DQPSK signal. Further, such as a decoding process or the like is performed in a receiver electric circuit 53.

Still further, the delay-line demodulator 1 as shown in FIG. 1 comprises one optical input waveguide 2 as a planar lightwave circuit (PLC), a Y-branch waveguide 3 for branching such the optical input waveguide 2, and Mach-Zehnder interferometer circuits 6 and 7 of two input terminals by two output terminals (2×2) type. Furthermore, a planar lightwave circuit including such the waveguides is comprised of a quartz based glass 30 on a silicon substrate 20 as a PLC substrate, by using a flame hydrolysis method (FHD method), a photolithography method, and a reactive ion etching method.

Next, the Mach-Zehnder interferometer circuit 6 comprises two of directional couplers 8 and 9, and two of waveguides 10 and 11 having a different waveguide length connected to between such the two directional couplers 8 and 9 respectively. As similar thereto, the Mach-Zehnder interferometer circuit 7 comprises two of directional couplers 12 and 13, and two of waveguides 14 and 15 having a different waveguide length connected to between such the two directional couplers 12 and 13 respectively.

According to the Mach-Zehnder interferometer circuit 6, the DQPSK signal transmitted from the optical fiber transmission path 54 to the optical receiver 50 is branched at the Y-branch waveguide 3, and then such the branched DQPSK signals (light signals) propagate through the two waveguides 10 and 11 having a different waveguide length therebetween. Moreover, the Mach-Zehnder interferometer circuit 6 is designed for delaying a phase of the light signal propagating through the waveguide 11 as one thereof as an amount of one symbol comparing to a phase of the light signal propagating through the waveguide 10 as the other one thereof.

As similar thereto, according to the Mach-Zehnder interferometer circuit 7, the DQPSK signal is branched at the Y-branch waveguide 3, and then such the branched DQPSK signals (light signals) propagate through the two waveguides 14 and 15 having a different waveguide length therebetween. Moreover, the Mach-Zehnder interferometer circuit 7 is designed for delaying a phase of the light signal propagating through the waveguide 15 as one thereof as an amount of one symbol comparing to a phase of the light signal propagating through the waveguide 14 as the other one thereof.

Further, a half wavelength plate 21 as just one plate is arranged at both central parts of the two waveguides 10 and 11 in the Mach-Zehnder interferometer circuit 6, and at both central parts of the two waveguides 14 and 15 in the Mach-Zehnder interferometer circuit 7 as well.

Still further, the Mach-Zehnder interferometer circuit 6 further comprises: a first heater A and a second heater C formed on the waveguide 11 as the one thereof as sandwiching the half wavelength plate 21 therebetween; and a third heater B and a fourth heater D formed on the waveguide 10 as the other one thereof as sandwiching the half wavelength plate 21 therebetween.

As similar thereto, the Mach-Zehnder interferometer circuit 7 further comprises: a first heater A and a second heater C formed on the waveguide 15 as the one thereof as sandwiching the half wavelength plate 21 therebetween; and a third heater B and a fourth heater D formed on the waveguide 14 as the other one thereof as sandwiching the half wavelength plate 21 therebetween. Such the individual heaters A to D are thin film heaters formed on an upper cladding layer for the waveguide corresponding thereto among the waveguides 10, 11, 14 and 15 formed on the silicon substrate 20. Furthermore, such the individual heaters A to D are tantalum based thin film heaters formed on the upper cladding layer for the individual waveguides for example, by using a spattering method.

Next, two of optical output waveguides 23 and 24 are connected to the directional couplers 9 in the Mach-Zehnder interferometer circuit 6. Moreover, two of optical output waveguides 25 and 26 are connected to the directional couplers 13 in the Mach-Zehnder interferometer circuit 7.

According to such the delay-line demodulator 1, a divergence amount of polarization PDλ is adjusted by driving the heater A and the heater D, or the heater B and the heater C, that are facing to each other as sandwiching the half wavelength plate 21 therebetween in the individual Mach-Zehnder interferometer circuits 6 and 7 respectively.

Moreover, for such the delay-line demodulator 1, it is required for a phase of the Mach-Zehnder interferometer circuit 7 to be shifted as n/2 from a phase of the Mach-Zehnder interferometer circuit 6. A process for performing the phase adjustment thereof is performed by driving any one of the heaters A to D in the individual Mach-Zehnder interferometer circuits 6 and 7, before adjusting the divergence amount of polarization PDλ by driving the heater A and the heater D, or the heater B and the heater C.

Moreover, for such the delay-line demodulator 1, it is required for a phase of the Mach-Zehnder interferometer circuit 7 to be shifted as π/2 from a phase of the Mach-Zehnder interferometer circuit 6. A process for performing the phase adjustment thereof is performed by driving any one of the heaters A to D in the individual Mach-Zehnder interferometer circuits 6 and 7, before adjusting the divergence amount of polarization PDλ by driving the heater A and the heater D, or the heater B and the heater C.

As described above, according to the present embodiment, the delay-line demodulator 1 as the planar lightwave circuit (PLC) type for demodulating the DQPSK signal is comprised of the planar lightwave circuit, wherein the Y-branch waveguide 3 for branching the DQPSK signal and the two Mach-Zehnder interferometer circuits 6 and 7 are formed on the one silicon substrate 20 as the PLC substrate.

Figure 1:
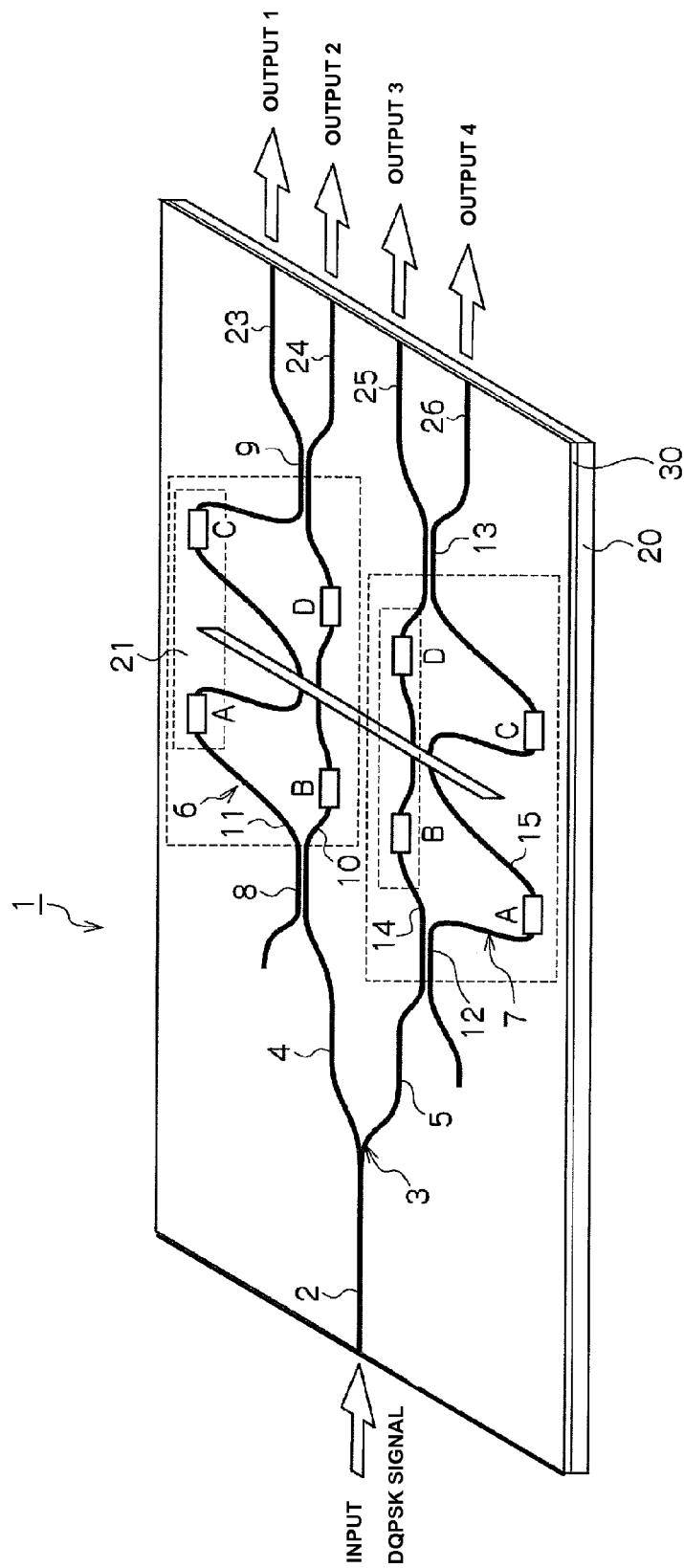
FIG. 1 is a diagrammatic perspective view showing a schematic configuration regarding a delay-line demodulator according to the first embodiment.

DESCRIPTION OF THE REFERENCE NUMERALS 1, 1A, 1B DELAY-LINE DEMODULATOR
2, 2A OPTICAL INPUT WAVEGUIDE
3 Y-BRANCH WAVEGUIDE
4, 5 TWO OF BRANCHED WAVEGUIDES
6 MACH-ZEHNDER INTERFEROMETER CIRCUIT OF 2×2 TYPE
7 SECOND MACH-ZEHNDER INTERFEROMETER CIRCUIT OF 2×2 TYPE
8, 9 DIRECTIONAL COUPLER
10, 11 TWO WAVEGUIDES OF DIFFERENT LENGTHS THEREBETWEEN
12, 13 DIRECTIONAL COUPLER
14, 15 TWO WAVEGUIDES OF DIFFERENT LENGTHS THEREBETWEEN
A FIRST HEATER
C SECOND HEATER C
B THIRD HEATER
D FOURTH HEATER
20 SILICON SUBSTRATE
21, 21a, 21b HALF WAVELENGTH PLATE

BEST MODE FOR INVENTION

An Example

The delay-line demodulator device 1 for the DQPSK signal of 40 Gbps line speed, which comprises the one Y-branch waveguide 3, and the Mach-Zehnder interferometer circuits 6 and 7 comprised of the quartz based glass 30, is manufactured on the silicon substrate 20, by using the flame hydrolysis method (FHD method), the photolithography method, and the reactive ion etching method.

Moreover, the tantalum based heaters (thin film heaters) A to D are formed on the waveguides 10, 11, 14 and 15 in each of the Mach-Zehnder interferometer circuits 6 and 7 by using the spattering method. And then for each of such the heaters A to D, a heater length thereof is designed to be 5000 μm and a heater width thereof is designed to be 60 μm respectively. Here, it is confirmed that a value of resistances therefor are approximately the similar to therebetween. Further, the half wavelength plate 21 is inserted into each of the central parts of the two waveguides in each of the Mach-Zehnder interferometer circuits 6 and 7 for suppressing the divergence amount of polarization (PDλ) of a spectrum. And then an initial PDλ (a through port) of the Mach-Zehnder interferometer circuit 6 at around 1550 nm is measured thereafter.

Figure 3:
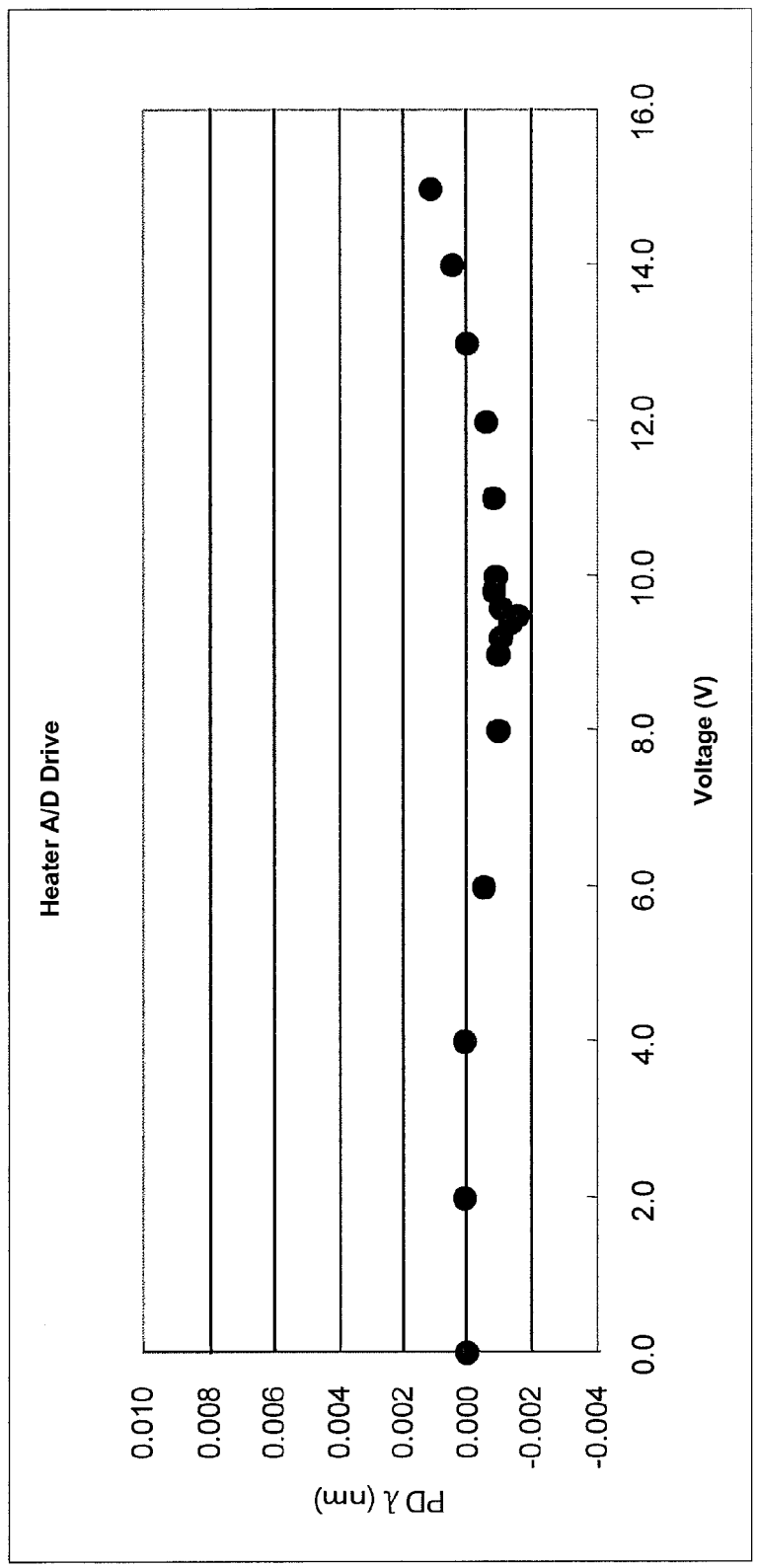
FIG. 3 is a graph showing a variation in a divergence amount of polarization PDλ at a time of driving a heater A and a heater D with changing a voltage to be applied to such the heaters.
Figure 4:
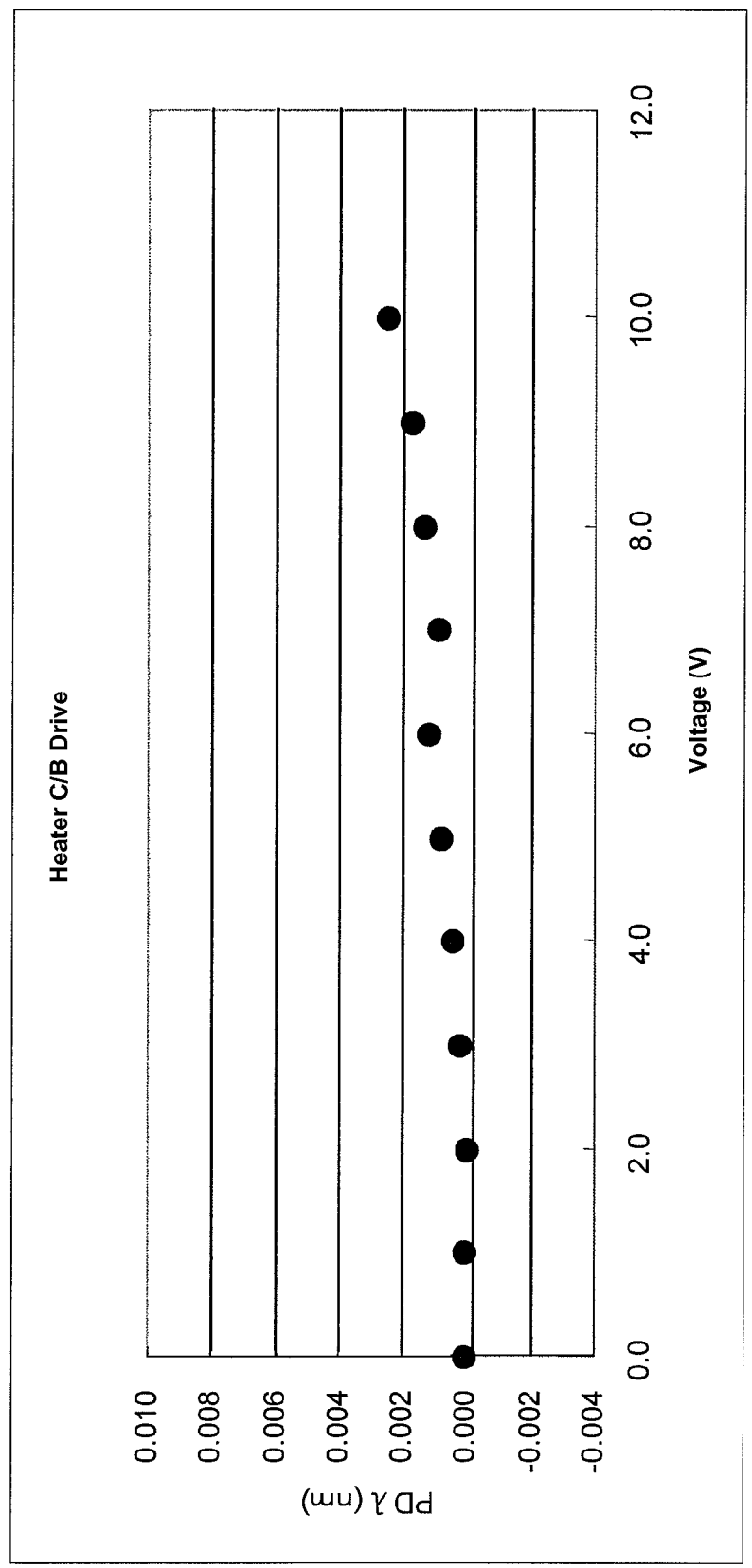
FIG. 4 is a graph showing a variation in a divergence amount of polarization PDλ at a time of driving a heater C and a heater B with changing a voltage to be applied to such the heaters.

Here, in a case of driving the heaters A and D, or the heaters B and C in each of the Mach-Zehnder interferometer circuits 6 and 7 by applying a similar voltage thereto respectively (so as not to occurring a wavelength shift), the PDλ is varied respectively, as shown in FIG. 3 in the case of driving the heaters A and D, and as shown in FIG. 4 in the case of driving the heaters C and B.

This is considered to occur because a stress internalized in the PLC layer or a stress caused by the heater layers is changed due to the applied voltage. According to FIG. 3, for minimizing the PDλ, it becomes clear that it is good to apply 9.5 V to each of the heaters A and D in each of the Mach-Zehnder interferometer circuits 6 and 7 respectively. In such the case thereof, it is obvious that the divergence amount of polarization (PDλ) becomes smaller as close to approximately −0.002 nm in the case of applying 9.5 V to each of the heaters A and D, according to the PDλ to be as 0 nm in a case where the applied voltage to each of the heaters A and D is zero, as shown in FIG. 3. Thus, by driving each of the heaters A and D in each of the Mach-Zehnder interferometer circuits 6 and 7, it becomes able to manufacture the delay-line demodulator 1 having the small divergence amount of polarization.

Moreover, here the PDλ has a tendency to become smaller in the case of driving each of the heaters A and D. However, there is no limitation thereto, and a heater to be driven is determined according to a state of the initial PDλ at a period of manufacturing the PLC. Further, here the applied voltage is approximately 10 V for the PDλ to be smaller, however, it is able to change to be a preferred value thereof by changing such as the heater length, the heater width, or the like.

Figure 5:
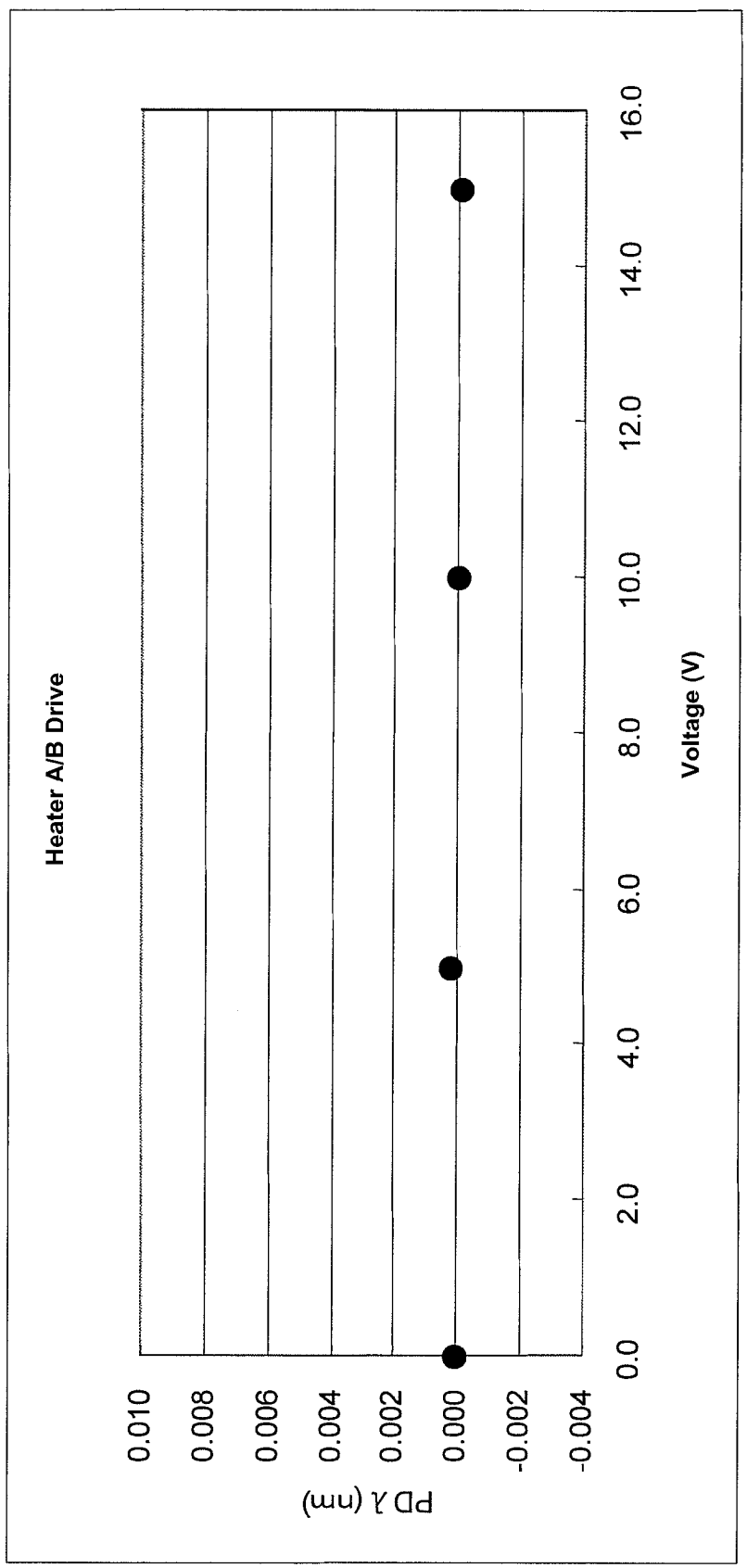
FIG. 5 is a graph showing a variation in a divergence amount of polarization PDλ at a time of driving a heater A and a heater B with changing a voltage to be applied to such the heaters.
Figure 6:
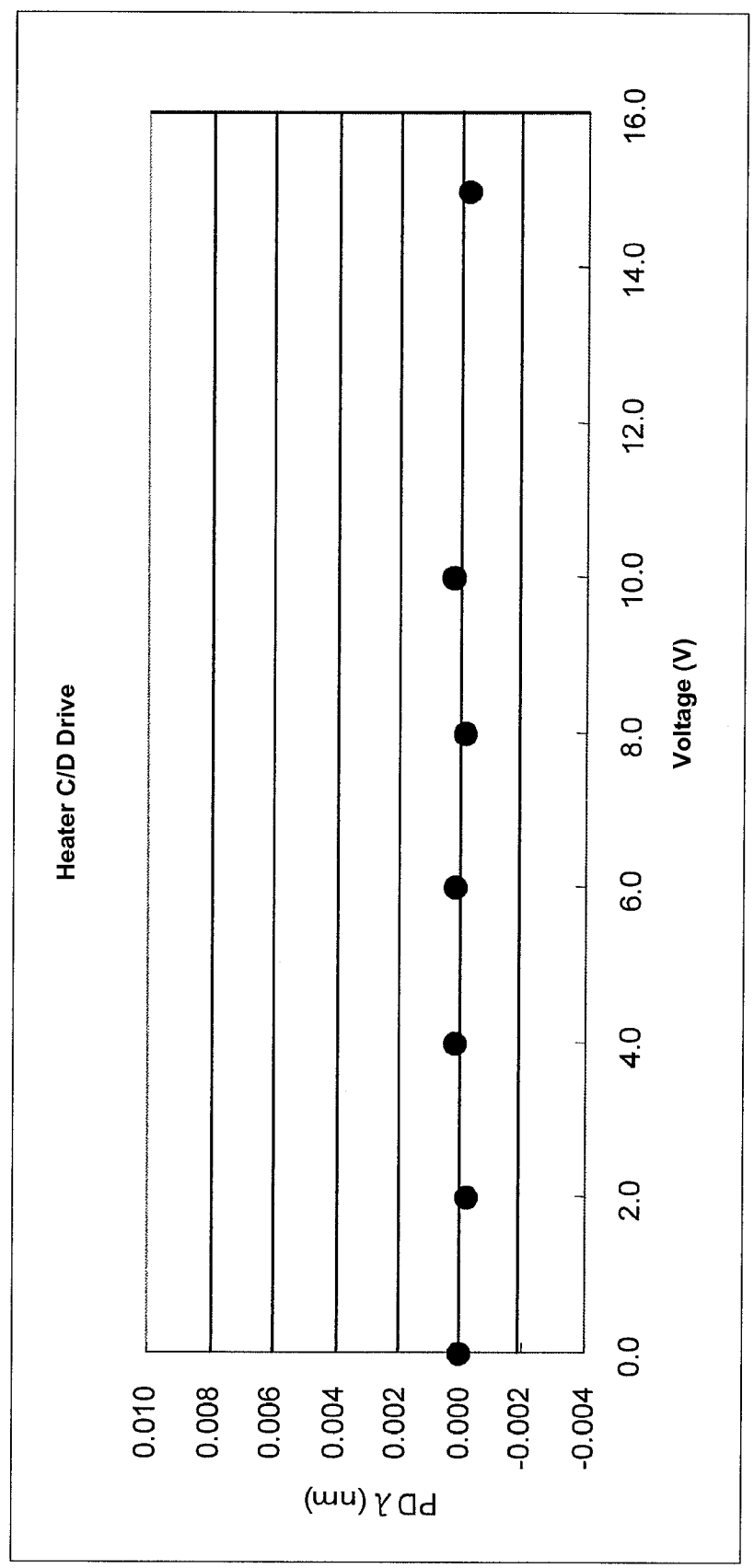
FIG. 6 is a graph showing a variation in a divergence amount of polarization PDλ at a time of driving a heater C and a heater D with changing a voltage to be applied to such the heaters.

Still further, FIG. 5 is a graph showing a case where the voltage is applied to the heaters A and B, and FIG. 6 is a graph showing a case where the voltage is applied to the heaters C and D, respectively. According to such the graphs, there is no variation in the PDλ even in the case of applying the voltage to the heaters A and B or the heaters C and D in each of the Mach-Zehnder interferometer circuits 6 and 7. For changing the PDλ, it is necessary to drive individually the heaters A and D or the heaters B and C respectively, that are facing to each other as sandwiching the half wavelength plate 21 in each of the Mach-Zehnder interferometer circuits 6 and 7.

According to the first embodiment comprising the above described configuration, it becomes able to obtain functions and advantages as described below.

1. It becomes able to adjust the divergence amount of polarization (PDλ), by applying the voltage (a similar voltage for example) to the heaters A and D or the heaters B and C in each of the Mach-Zehnder interferometer circuits 6 and 7, and then by driving thereof.

2. It becomes able to obtain the delay-line demodulator having the small divergence amount of polarization for the DQPSK signal of 40 Gbps line speed, that it is hard to obtain conventionally, by applying the voltage to the heaters A and D in each of the Mach-Zehnder interferometer circuits 6 and 7 for minimizing the PDλ, and then by driving thereof.

3. It becomes able to prevent from occurring the wavelength shift by applying a similar voltage individually to the heater A and the heater D, or to the heater B and the heater C, for adjusting the divergence amount of polarization (PDλ), as each of the resistance values of the heaters A to D in each of the Mach-Zehnder interferometer circuits 6 and 7 is approximately the same.

4. It becomes easier to manufacture the delay-line demodulator for the DQPSK signal of 40 Gbps line speed, because of configuring the delay-line demodulator 1 as the planar lightwave circuit type using the planar lightwave circuit in which the Y-branch waveguide 3 to branch the DQPSK signal and the two Mach-Zehnder interferometer circuits 6 and 7 are formed on the one silicon substrate (PLC substrate) 20.

EMBODIMENTS

The Second Embodiment

Figure 7:
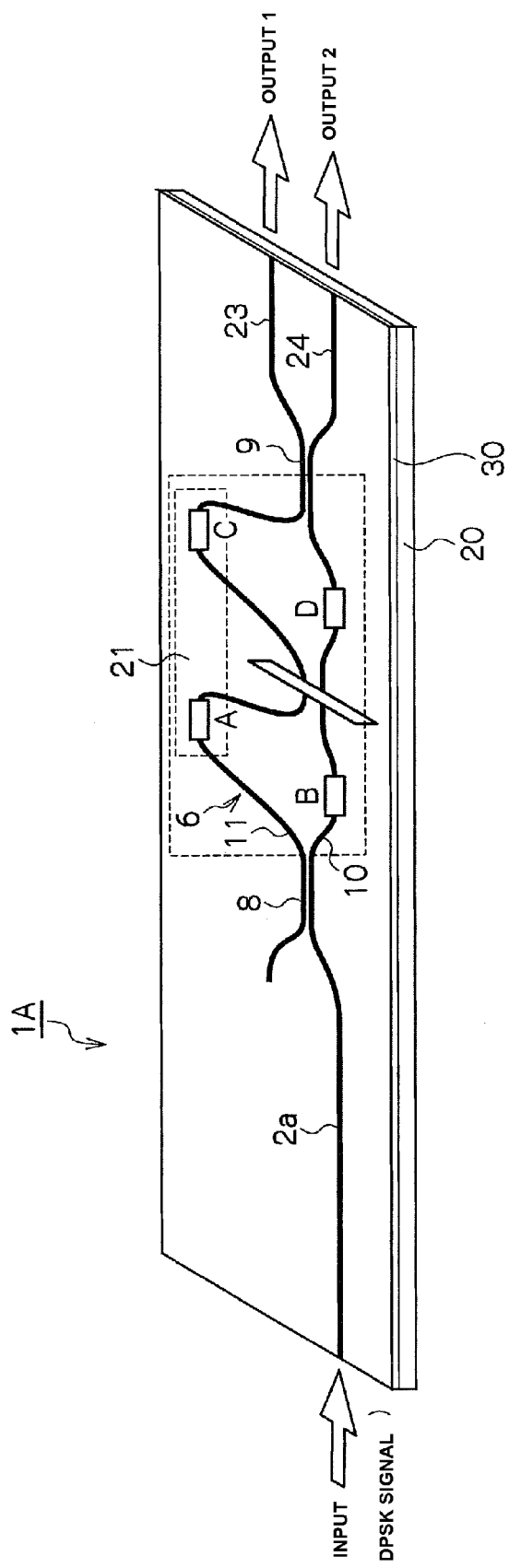
FIG. 7 is a diagrammatic perspective view showing a schematic configuration regarding a delay-line demodulator according to the second embodiment.

FIG. 7 shows a schematic configuration regarding a delay-line demodulator 1A according to the second embodiment.

Such the delay-line demodulator 1A is a delay-line demodulator of a planar lightwave circuit (PLC) type for demodulating a DPSK signal, and is the delay-line demodulator for a DPSK signal of 40 Gbps line speed to be used for an optical transmission system with using the DPSK method.

Figure 2:
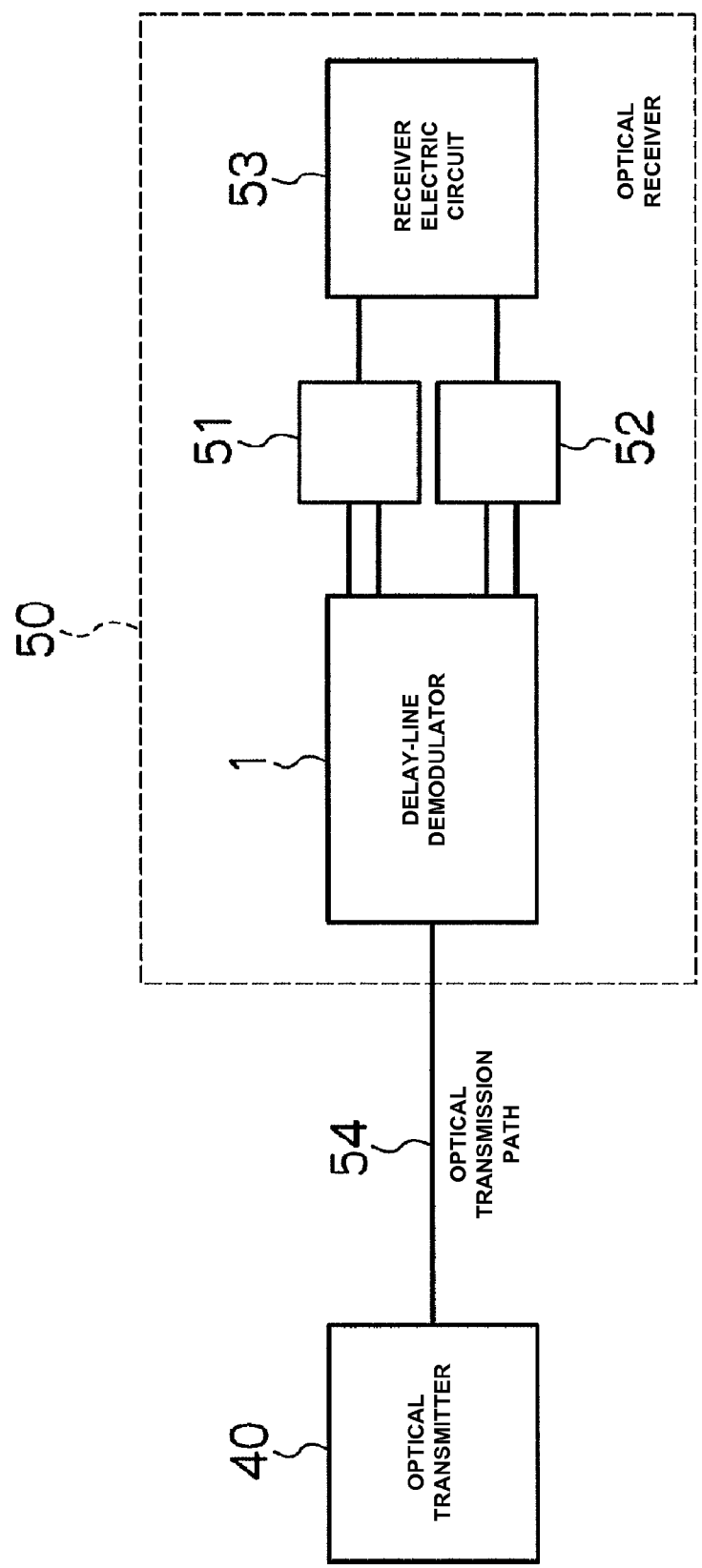
FIG. 2 is a block diagram showing a schematic configuration of an optical transmission system with using a DQPSK method.

According to such the optical transmission system, the DPSK signal is transmitted from an optical transmitter (refer to the optical transmitter 40 as shown in FIG. 2), which is modulated into phase data including a phase of a propagation wave (θ or θ+π) for two data as values (0 or 1) of individual bits comprised of data of one bit, with corresponding to a variation in values of neighboring two bits. Moreover, a DPSK signal transmitted from the optical transmitter to an optical receiver (refer to the optical receiver 50 as shown in FIG. 2) is converted into a light intensity signal in the delay-line demodulator 1A, and then such the light intensity signal is converted into an electric signal in a balanced receiver. Thus, it becomes able to demodulate the above mentioned two data regarding the DPSK signal.

Further, such the delay-line demodulator 1A comprises one optical input waveguide 2A as a planar lightwave circuit (PLC), and a Mach-Zehnder interferometer circuit 6 of two input terminals by two output terminals (2×2) type to be connected with such the optical input waveguide 2A.

Still further, the Mach-Zehnder interferometer circuit 6 comprises two of waveguides 10 and 11 having a different waveguide length therebetween through which the DPSK signal propagates respectively. And then it is configured for delaying a phase of the DPSK signal propagating through the waveguide 11 as the one thereof as an amount of one bit comparing to a phase of the DPSK signal propagating through the waveguide 10 as the other one thereof.

Furthermore, the delay-line demodulator 1A further comprises: a half wavelength plate 21 arranged at both central parts of the two waveguides 10 and 11; a first heater A and a second heater C formed on the waveguide 11 as the one thereof as sandwiching the half wavelength plate 21 therebetween; and a third heater B and a fourth heater D formed on the waveguide 10 as the other one thereof as sandwiching the half wavelength plate 21 therebetween.

According to such the delay-line demodulator 1A, a divergence amount of polarization (PDλ) is adjusted by driving the first heater A and the fourth heater D, or the third heater B and the second heater C, that are facing to each other as sandwiching the half wavelength plate 21 therebetween respectively.

According to the second embodiment comprising the above described configuration, it becomes able to obtain functions and advantages as described below.

1. It becomes able to adjust the divergence amount of polarization (PDλ), by applying the voltage (a similar voltage for example) to the heaters A and D or the heaters B and C in the Mach-Zehnder interferometer circuit 6, and then by driving thereof.

2. It becomes able to manufacture the delay-line demodulator having the small divergence amount of polarization (PDλ) for the DPSK signal, by applying the voltage to the heaters A and D in the Mach-Zehnder interferometer circuit 6 for minimizing the PDλ, and then by driving thereof.

Here, it is able to embody the present invention as well, by modifying as described below.

Figure 8:
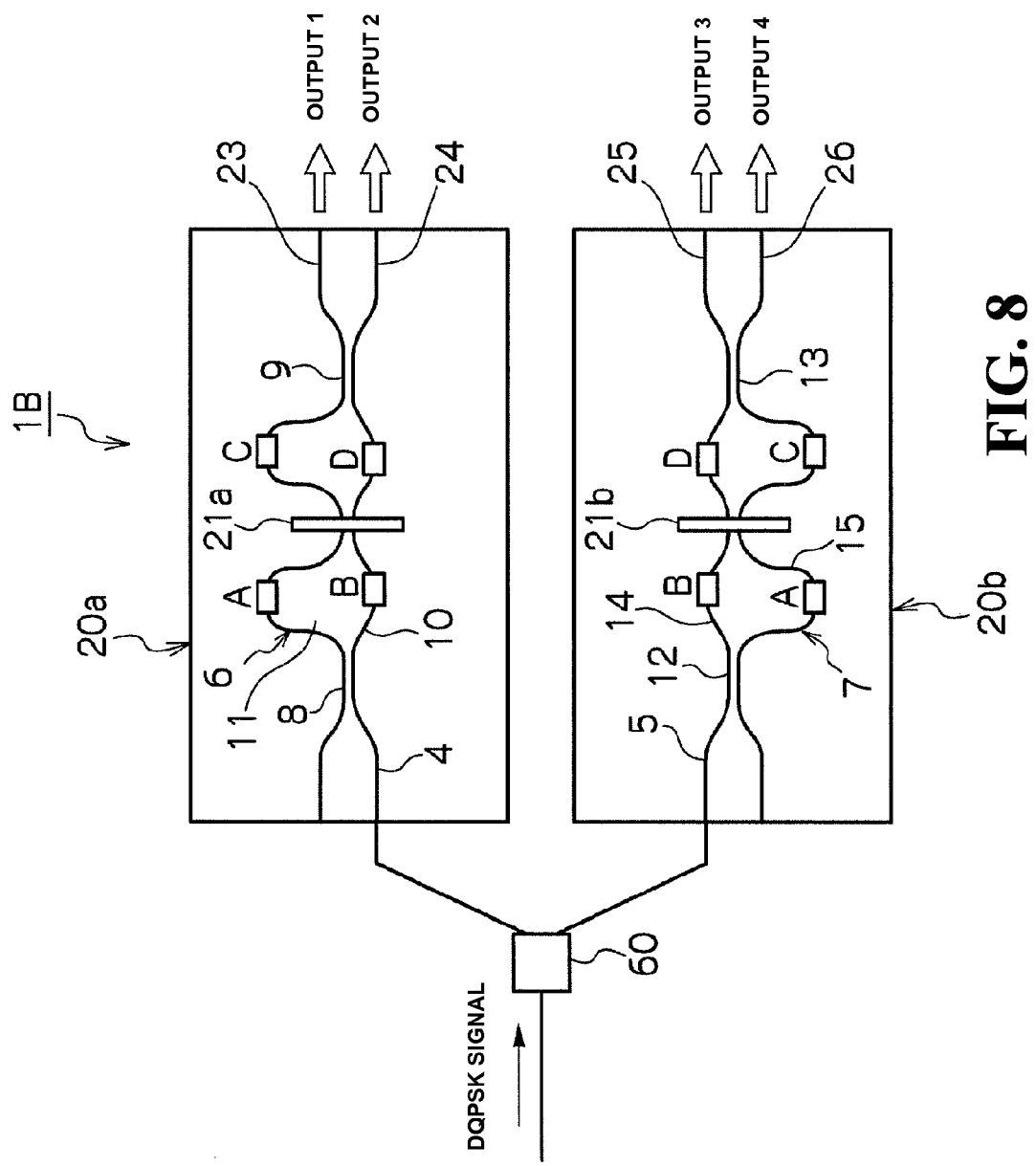
FIG. 8 is a block diagram showing a schematic configuration of a modified example regarding the delay-line demodulator according to the first embodiment.

1. According to the above described first embodiment, the delay-line demodulator 1 as the planar lightwave circuit type (PLC type) for demodulating the DQPSK signal is configured using the planar lightwave circuit in which the Y-branch waveguide 3 to branch the DQPSK signal and the two Mach-Zehnder interferometer circuits 6 and 7 are formed on the one silicon substrate (PLC substrate) 20. However, the present invention is not limited to such the configuration. For example, the present invention is also applicable to a delay-line demodulator 1B as shown in FIG. 8.

Such the delay-line demodulator 1A is configured that each of the Mach-Zehnder interferometer circuits 6 and 7 is a planar lightwave circuit to be formed individually on silicon substrates 20a and 20b as different PLC substrates to be independent from each other, and that a DQPSK signal is branched using a coupler 60 existing at outsides of the silicon substrates 20a and 20b, and then is input into each of the Mach-Zehnder interferometer circuits 6 and 7. Here, the symbols 21a and 21b designate half wavelength plates as similar to the half wavelength plate 21 as shown in FIG. 1.

2. According to the above described first embodiment, the similar voltage is applied to each of the heaters so as not to generate the wavelength shift. However, it is not limited thereto, and it may be available to apply a different voltage to each of the heaters as well, with taking into consideration of the value of resistance regarding each of the heaters, so as not to generate the wavelength shift, because a variation may occur in the value of resistance regarding each of the heaters due to a manufacturing process.

3. According to the above described first embodiment, the similar voltage is applied to each of the heaters so as not to generate the wavelength shift. However, it may be available to apply a different voltage to each of the heaters as well, with taking into consideration of a phase focusing between the phase of the Mach-Zehnder interferometer circuit 6 and the phase of the Mach-Zehnder interferometer circuit 7.

What is claimed is:

1. A method for producing a delay-line demodulator of a planar lightwave circuit type for a differential quadrature phase shift keying (DQPSK) signal to be demodulated, comprising the following steps of:
   (a) forming individual Mach-Zehnder interferometers comprising a plurality of waveguides having different lengths therebetween, through which a light signal branched from the DQPSK signal propagates, wherein a phase of the light signal propagating at one side of the waveguides is delayed an amount of one symbol as compared to a phase of the light signal propagating at another side of the waveguides;
   (b) arranging a half wavelength plate at a central part of the waveguide in each of the Mach-Zehnder interferometers;
   (c) forming a first heater (A) and a second heater (C) on the one side of the waveguides in the individual Mach-Zehnder interferometers as sandwiching the half wavelength plate therebetween; and forming a third heater (B) and a fourth heater (D) on the other side of the waveguides in the individual Mach-Zehnder interferometers as sandwiching the half wavelength plate therebetween;
   (d) adjusting a divergence amount of polarization by driving the first heater (A) and the fourth heater (D), or the third heater (B) and the second heater (C).

2. The method of claim 1, wherein step for forming the individual Mach-Zehnder interferometers includes forming the individual Mach-Zehnder interferometers and a Y-branch waveguide for branching the DQPSK signal on a planar lightwave circuit (PLC) substrate.

3. The method of claim 1, wherein step for forming the individual Mach-Zehnder interferometers includes forming the individual Mach-Zehnder interferometers on individual planar lightwave circuit (PLC) substrates separately.

4. A method for producing a delay-line demodulator of a planar lightwave circuit type for a differential quadrature phase shift keying (DQPSK) signal to be demodulated, comprising the following steps of:
   (a) forming individual Mach-Zehnder interferometers comprising two waveguides having different lengths therebetween, through which the DQPSK signal propagates, wherein a phase of the light signal propagating at one side of the waveguides is delayed an amount of one bit as compared to a phase of the light signal propagating at another side of the waveguides;
   (b) arranging a half wavelength plate at a central part of the two waveguides;
   (c) forming a first heater (A) and a second heater (C) on the one side of the waveguides as sandwiching the half wavelength plate therebetween; and forming a third heater (B) and a fourth heater (D) on the other side of the waveguides in the individual Mach-Zehnder interferometers as sandwiching the half wavelength plate therebetween
   (d) adjusting a divergence amount of polarization by driving the first heater (A) and the fourth heater (D), or the third heater (B) and the second heater (C).

5. The method of claim 4, wherein step for forming the individual Mach-Zehnder interferometers includes forming the individual Mach-Zehnder interferometers and a Y-branch waveguide for branching the DQPSK signal on a planar lightwave circuit (PLC) substrate.

6. The method of claim 4, wherein step for forming the individual Mach-Zehnder interferometers includes forming the individual Mach-Zehnder interferometers on individual planar lightwave circuit (PLC) substrates separately.

7. The method of claim 4, wherein the step of forming the individual Mach-Zehnder interferometers includes forming at least one of the individual Mach-Zehnder interferometers on a planar lightwave circuit (PLC) comprising quartz based glass.

8. The method of claim 4, wherein the step of forming the individual Mach-Zehnder interferometers includes forming at least one of the individual Mach-Zehnder interferometers on a planar lightwave circuit (PLC) comprising quartz based glass on a silicon substrate.

9. The method of claim 8, wherein the step of forming the individual Mach-Zehnder interferometers includes forming at least one of the individual Mach-Zehnder interferometers on the PLC employing a flame hydrolysis method.

10. The method of claim 8, wherein the step of forming the individual Mach-Zehnder interferometers includes forming at least one of the individual Mach-Zehnder interferometers on the PLC employing a photolithography method.

11. The method of claim 8, wherein the step of forming the individual Mach-Zehnder interferometers includes forming at least one of the individual Mach-Zehnder interferometers on the PLC employing a reactive ion etching method.

12. The method of claim 4, wherein the step of driving the first heater (A) and the fourth heater (D) includes applying a voltage of approximately 9.5 V individually to the first heater (A) and the fourth heater (D).

13. The method of claim 4, wherein the step of driving the second heater (B) and the third heater (C) includes applying a voltage of approximately 9.5 V individually to the second heater (B) and the third heater (C).

14. The method of claim 4, wherein the step of driving the first heater (A) and the fourth heater (D) includes individual driving the first heater (A) and the fourth heater (D) at a similar voltage.

15. The method of claim 4, wherein the step of driving the second heater (B) and the third heater (C) includes individually driving the second heater (B) and the third heater (C) at a similar voltage.

16. The method of claim 4, wherein the step of forming the first heater (A) and the second heater (B) or the step of forming the third heater (C) and the fourth heater (D) includes forming at least one of the first heater (A), the second heater (B), the third heater (C) or the fourth heater (D) as a thin film heater.

17. The method of claim 4, wherein the step of forming the first heater (A) and the second heater (B) or the step of forming the third heater (C) and the fourth heater (D) includes forming at least one of the first heater (A), the second heater (B), the third heater (C) or the fourth heater (D) as a tantalum based heater.

18. The method of claim 4, wherein the step of forming the first heater (A) and the second heater (B) or the step of forming the third heater (C) and the fourth heater (D) includes forming at least one of the first heater (A) and the second heater (B) on the one side of the waveguide or the third heater (C) and the fourth heater (D) on the other side of the waveguide by spattering.

19. The method of claim 4, wherein the step of forming the first heater (A) and the second heater (B) and the step of forming the third heater (C) and the fourth heater (D) includes forming the first heater (A) and the fourth heater (D) with approximately equal resistance values.

20. The method of claim 4, wherein the step of forming the first heater (A) and the second heater (B) and the step of forming the third heater (C) and the fourth heater (D) includes forming the second heater (B) and the third heater (C) with approximately equal resistance values.

* * * * *